(12) United States Patent
Welch

(10) Patent No.: US 11,050,879 B1
(45) Date of Patent: Jun. 29, 2021

(54) CALL TRAFFIC DATA MONITORING AND MANAGEMENT

(71) Applicant: FIRST ORION CORP., Little Rock, AR (US)

(72) Inventor: Samuel Kenton Welch, Conway, AR (US)

(73) Assignee: FIRST ORION CORP., Little Rock, AR (US)

( * ) Notice: Subject to any disclaimer, the term of this patent is extended or adjusted under 35 U.S.C. 154(b) by 0 days.

(21) Appl. No.: 16/732,284

(22) Filed: Dec. 31, 2019

(51) Int. Cl.
*H04M 3/42* (2006.01)
*H04M 3/436* (2006.01)

(52) U.S. Cl.
CPC ....... *H04M 3/42059* (2013.01); *H04M 3/436* (2013.01)

(58) Field of Classification Search
CPC ...... H04M 15/47; H04M 15/58; H04M 1/663; H04M 2215/0148; H04M 3/2281; H04M 3/42042; H04M 3/42059; H04M 3/436; H04M 7/0078; H04L 51/12; H04L 65/1076
See application file for complete search history.

(56) References Cited

U.S. PATENT DOCUMENTS

| | | | |
|---|---|---|---|
| 5,956,634 A * | 9/1999 | Otterson | H04M 15/47 455/410 |
| 9,591,131 B2 | 3/2017 | Quilici et al. | |
| 10,601,986 B1 | 3/2020 | Botner et al. | |
| 2007/0165821 A1 | 7/2007 | Altberg et al. | |
| 2008/0084975 A1 | 4/2008 | Schwartz | |
| 2010/0226261 A1 | 9/2010 | Piche | |
| 2015/0181397 A1 | 6/2015 | Dudai et al. | |
| 2016/0150092 A1* | 5/2016 | Flaks | H04L 63/00 379/114.14 |
| 2016/0150414 A1 | 5/2016 | Flaks et al. | |
| 2016/0323446 A1 | 11/2016 | Farrand et al. | |
| 2016/0360036 A1 | 12/2016 | Ansari | |

* cited by examiner

*Primary Examiner* — Quoc Thai N Vu

(57) ABSTRACT

One example method of operation may include identifying one or more call parameters associated with each of a number of calls received over a fixed period of time, assigning scores to each of the calls based on the one or more identified call parameters for each of the plurality of calls, assigning one or more of the calls to a scam call category based on the assigned scores, and responsive to the assigning of the one or more of the calls to a scam call category, determining whether a number of remaining calls of the calls, which are not assigned to the scam call category, have increased or decreased beyond a deviation margin of a target percentage of calls.

20 Claims, 8 Drawing Sheets

300

CALL TRAFFIC DATA MONITORING AND MANAGEMENT

TECHNICAL FIELD OF THE APPLICATION

This application relates to call monitoring on a call management network, and more specifically to call traffic data monitoring and management.

BACKGROUND OF THE APPLICATION

Conventionally, mobile device users receive calls from undesired sources every day and sometimes several times an hour depending on the particular day. The source numbers which are used to dial the users may be local numbers, long-distance numbers, anonymous numbers, spoofed numbers, etc. The calls may be spam calls, scam calls, robocalls, etc.

Validation of calls to identify which calls are legitimate is part of the scam call management process. For example, call origination validation is one approach to identifying whether a call should be routed, answered, blocked, etc. Current approaches to validating calls may require a number of burdensome operations and may not be performed fast enough to maintain a real-time scam call management solution.

SUMMARY OF THE APPLICATION

Example embodiments of the present application provide a method including one or more of identifying one or more call parameters associated with each of a plurality of calls received over a fixed period of time, assigning scores to each of the plurality of calls based on the one or more identified call parameters for each of the plurality of calls, assigning one or more of the plurality of calls to a scam call category based on the assigned scores, and responsive to the assigning of the one or more of the plurality of calls to a scam call category, determining whether a number of remaining calls of the plurality of calls, which are not assigned to the scam call category, have increased or decreased beyond a deviation margin of a target percentage of calls.

Another example embodiment may include an apparatus that includes a processor configured to identify one or more call parameters associated with each of a plurality of calls received over a fixed period of time, assign scores to each of the plurality of calls based on the one or more identified call parameters for each of the plurality of calls, assign one or more of the plurality of calls to a scam call category based on the assigned scores, and responsive to the one or more of the plurality of calls to being assigned a scam call category, determine whether a number of remaining calls of the plurality of calls, which are not assigned to the scam call category, have increased or decreased beyond a deviation margin of a target percentage of calls.

Still another example embodiment may include a non-transitory computer readable storage medium configured to store instructions that when executed cause a processor to perform identifying one or more call parameters associated with each of a plurality of calls received over a fixed period of time, assigning scores to each of the plurality of calls based on the one or more identified call parameters for each of the plurality of calls, assigning one or more of the plurality of calls to a scam call category based on the assigned scores, and responsive to the assigning of the one or more of the plurality of calls to a scam call category, determining whether a number of remaining calls of the plurality of calls, which are not assigned to the scam call category, have increased or decreased beyond a deviation margin of a target percentage of calls.

Still another example embodiment may include a method that includes at least one of determining a call received from a calling party and intended for a subscriber device has an elevated likelihood of being a scam call, determining a percentage of calls over a current period of time being filtered as scam calls by a carrier server, when the percentage of calls being filtered as scam calls during the current period of time is above a call threshold percentage, retrieving call history information associated with a subscriber profile of the subscriber device, identifying one or more call patterns from the call history information of the subscriber profile corresponding to the received call, and determining whether to permit the received call based on the identified one or more call patterns.

Still yet another example embodiment may include an apparatus that includes a processor configured to determine a call received from a calling party and intended for a subscriber device has an elevated likelihood of being a scam call, determine a percentage of calls over a current period of time being filtered as scam calls by a carrier server, when the percentage of calls being filtered as scam calls during the current period of time is above a call threshold percentage, retrieve call history information associated with a subscriber profile of the subscriber device, identify one or more call patterns from the call history information of the subscriber profile corresponding to the received call, and determine whether to permit the received call based on the identified one or more call patterns.

Still yet another example embodiment may include a non-transitory computer readable storage medium configured to store instructions that when executed cause a processor to perform one or more of determining a call received from a calling party and intended for a subscriber device has an elevated likelihood of being a scam call, determining a percentage of calls over a current period of time being filtered as scam calls by a carrier server, when the percentage of calls being filtered as scam calls during the current period of time is above a call threshold percentage, retrieving call history information associated with a subscriber profile of the subscriber device, identifying one or more call patterns from the call history information of the subscriber profile corresponding to the received call, and determining whether to permit the received call based on the identified one or more call patterns.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide call filtering baseline setup procedures and call filtering operations for incoming calls. A baseline may be setup based on incoming calls by applying call filtering criteria associated with call parameter auditing procedures. Once a baseline is established, subsequent calls received may be filtered by applying the baseline filtering data, which may have been adjusted based on the most recent baseline call parameter data. Incoming calls may also be filtered according to specific subscriber information, which is applied when the baseline call percentage is not satisfactory at a particular time (e.g., baseline call data deviates from a target by an excessive margin amount).

Figure 1:
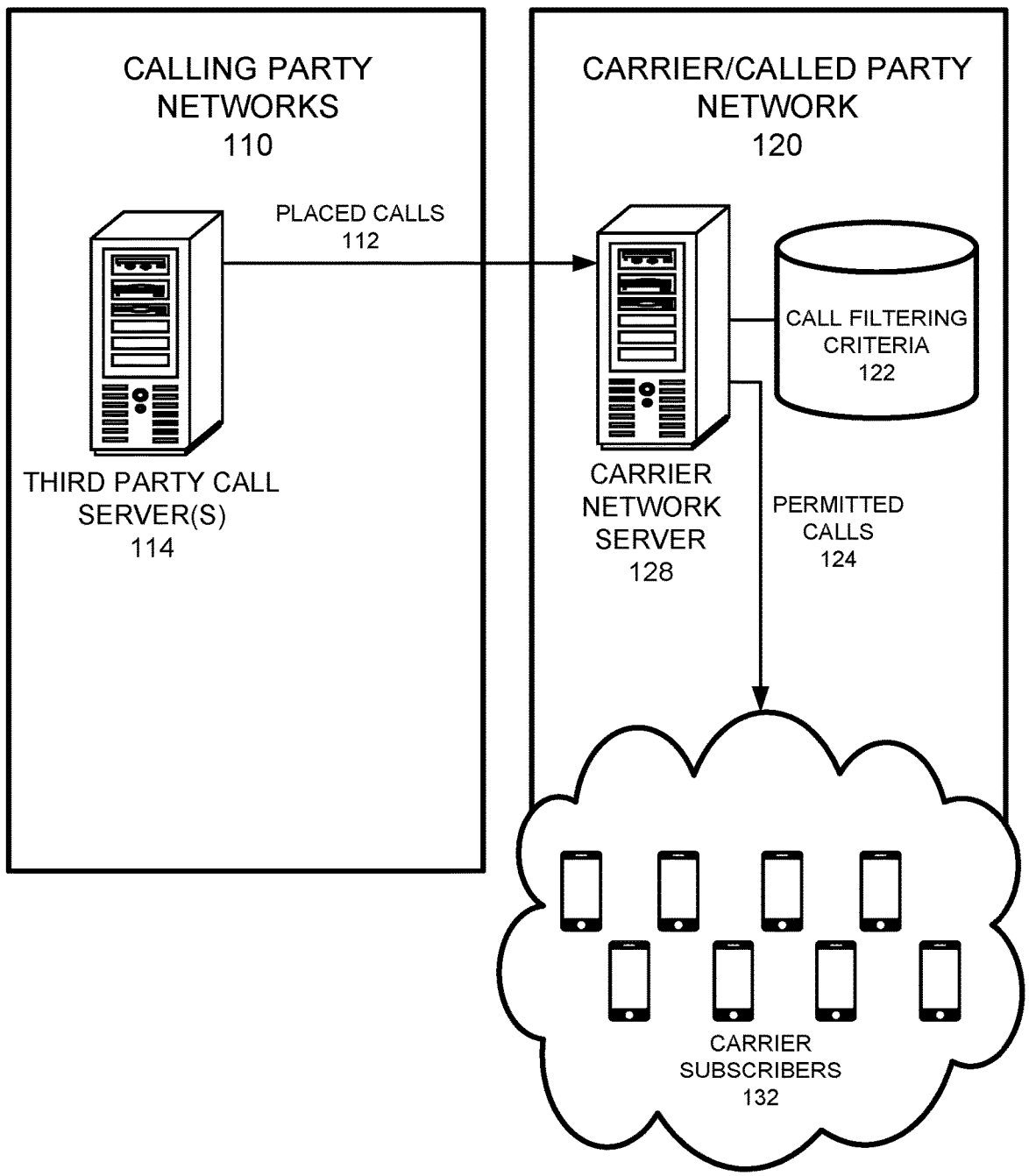
FIG. 1 illustrates an example network configuration of a call processing network for receiving and filtering incoming calls for a particular carrier network according to example embodiments.

FIG. 1 illustrates an example network configuration of a call processing network for receiving and filtering incoming calls for a particular carrier network according to example embodiments. Referring to FIG. 1, the configuration 100 includes a calling party network(s) 110, which may be a calling entity that initiates a call to a subscriber in a carrier network 120 being managed by a scam call management process. A third party call server 114 may forward call data messages, such as session initiation protocol (SIP) INVITE messages for a digital call placement protocol. The calls 112 may be received from various third party networks at a carrier network server 128, which is part of a called party/carrier network 120. When the calls are received, each call may be screened by identifying certain call parameters in a call message associated with the call. The call filtering criteria 122 may provide weights to assign to the call parameters from a list of call parameters weights from a current baseline approach to weighting the call parameters. The weights are applied, the calls are scored based on the sum of weights and/or other factors, and the calls which are scored at a level that is below a scam call threshold level are permitted 124 instead of being blocked. The carrier subscribers 132 are then forwarded corresponding calls which were intended for their devices and which are not labeled as scam calls.

Figure 2:
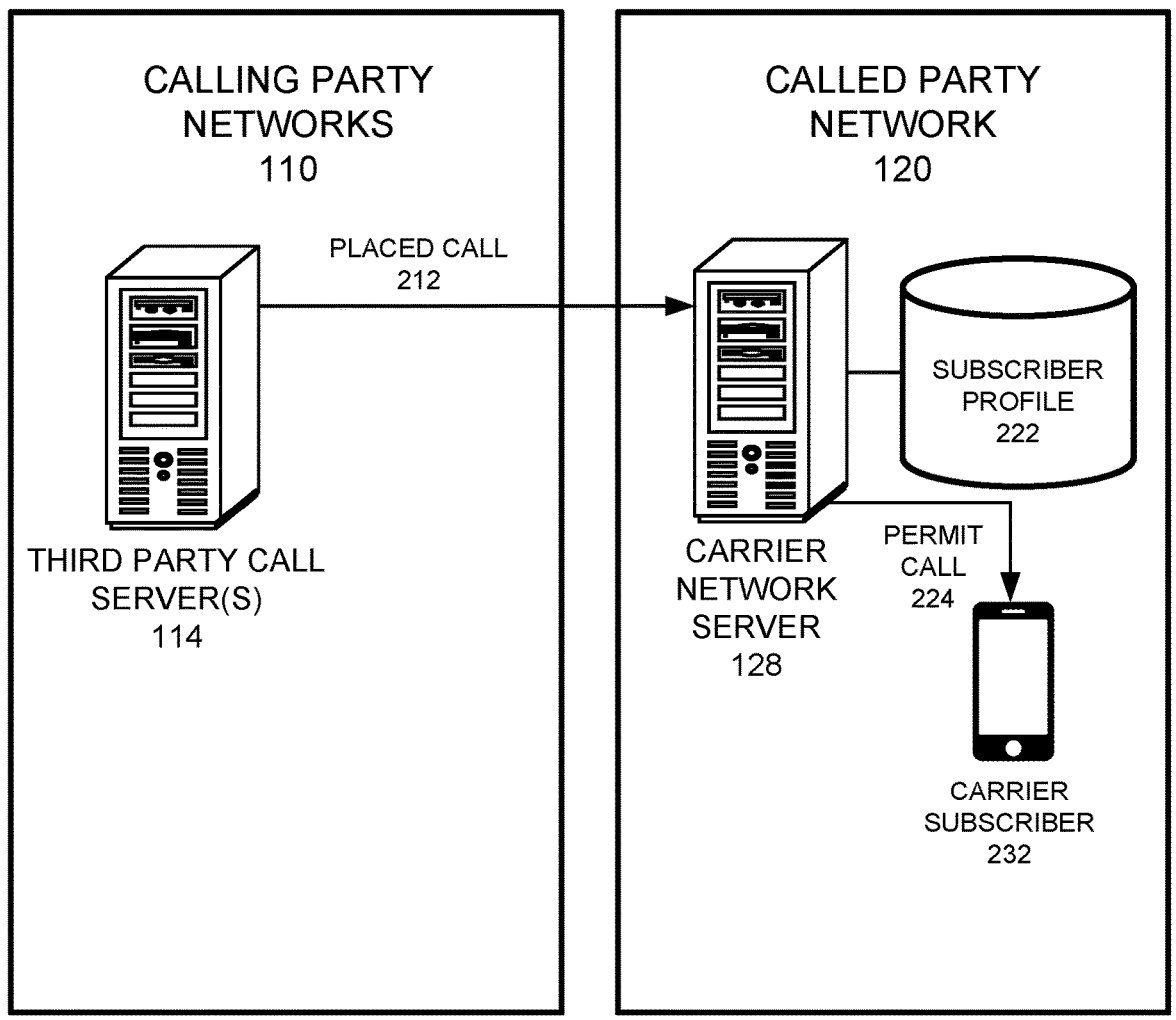
FIG. 2 illustrates another example network configuration of a call processing network for receiving and filtering an incoming call for a particular carrier network based on subscriber profile information according to example embodiments.

FIG. 2 illustrates another example network configuration of a call processing network for receiving and filtering an incoming call for a particular carrier network based on subscriber profile information according to example embodiments. Referring to FIG. 2, the configuration 200 provides an example where a specific call is examined for a particular subscriber. The call 212 may be received and processed prior to being forwarded 224 to a carrier subscriber 232. The call may be recognized as having a potential for scam based on a score assigned to the call, which is based on call parameters associated with the call message data. When the call is identified as scam or a number/percentage of recent calls are labeled as scam, another subscriber-specific criteria may be invoked to determine how to process the call. For example, the subscriber profile information 222 may be retrieved to identify whether the subscriber has call history information which identifies the current caller of the placed call 212. The caller history information may identify previous calling history between the caller and the subscriber 232, which can assist with a decision as to whether the current call should be forwarded to the carrier or blocked.

Figure 3A:
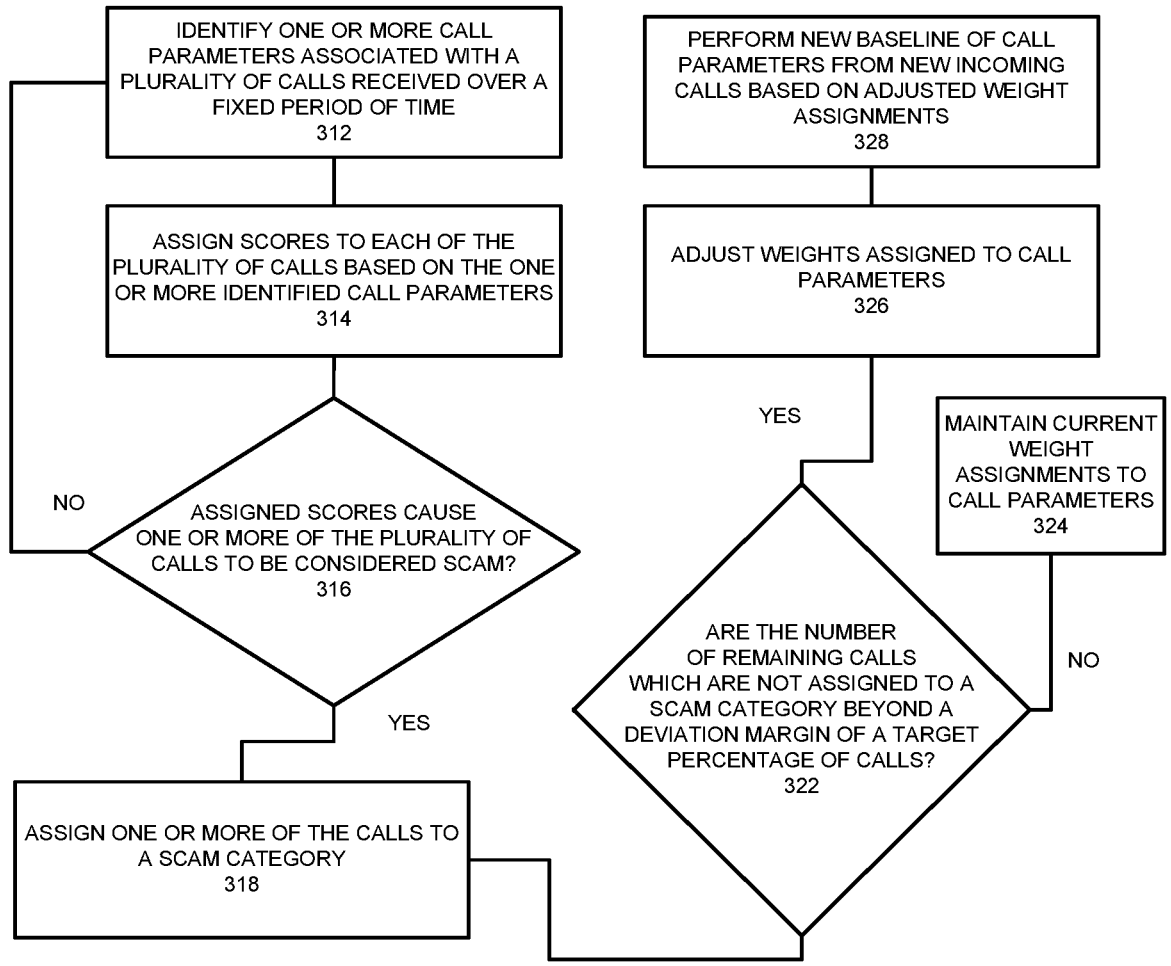
FIG. 3A illustrates a call management procedure for scoring and filtering incoming calls according to example embodiments.

FIG. 3A illustrates a call management procedure for scoring and filtering incoming calls according to example embodiments. Referring to FIG. 3A, in this example 300, a baseline of calls received at a particular carrier over a period of time (e.g., 5, 10 minutes, etc.) are scored based on scoring guidelines, such as parameter weights which are applied to the identified call parameters. In one example, responsive to various calls being received at a particular carrier server, one or more call parameters are identified 312, which are associated with each of those plurality of calls received over a fixed period of time. The parameters are each assigned scores 314 for each of the plurality of calls. This way, each incoming call will be assigned a score separately based on its independent call parameters. For example, when an IP address is identified a threshold number of times in a particular time period, the IP address will be a suspect call parameter for subsequent calls that will invoke a weighted value (i.e., +2) each time that IP address appears in a call parameter of an incoming call. Other IP addresses may not invoke a weighted value being added to the incoming call assuming those IP addresses are not identified at a particular frequency of instances and time. This is just one example of a suspect call parameter causing a scam likelihood score to increase for a particular call, however, other call parameters, if identified, may cause a scam likelihood score to increase.

Once the calls are scored, the scores may be identified and compared to a threshold call score to identify whether the call will be designated as a scam likely call 316. If the score is not equal to or above the scam likely score, then the call may be considered a regular permissible call. The calls that are above the threshold may be designated to a scam category 318. The scam call categories may include very likely (i.e., above a highest threshold), likely (i.e., above a high threshold but below the highest threshold), and somewhat likely (i.e., above a suspect threshold but below the high threshold).

In another applied criteria for identifying scam calls, the number or percentage of remaining calls, which are not identified as scam, which exceed, as a total number of calls, a particular deviation margin in either a surplus or a deficiency, may cause a weight distribution made to certain call parameters. For example, if a target percentage of calls is 90 percent or 'X' number of calls over a period of time, and the calls which are being forwarded and not identified as scam and not blocked has deviated outside a hysteresis margin near the target (i.e., 10 percent) 322, then the call parameters may be changed 326. For example, if too many calls are identified as scam, then one or more flagged IP addresses which are weighted with a +4 value when identified may be modified to represent a +3 or a +2 value when scoring subsequent calls with the new adjusted weight values for the call parameters 326. If however, the target is being met substantially and is within the margin of deviation, then the current weight assignments to those call parameters may be maintained 324. Then, the modified call parameters can be applied to new incoming calls 328 for a new call scoring procedure that may score calls differently in an attempt to reach the target call numbers.

When assigning scores to each of the plurality of calls based on the one or more identified call parameters for each of the plurality of calls, the process may include summing weights assigned to each of the one or more identified call parameters for each of the plurality of calls. Also, when the number of remaining calls has decreased beyond a deviation margin of the target number of calls, then the weights assigned to one or more of the call parameters can be decreased to create the new one or more modified call parameters. Additionally, when identifying the modified call parameters associated with each of a plurality of new calls received over another fixed period of time that is later than the original fixed period of time, then scores may be assigned to each of the plurality of new calls based on the decreased one or more assigned weights assigned to the modified call parameters. When the number of remaining calls has increased beyond a deviation margin of the target number of calls, the one or more weights assigned to one or more of the call parameters may be increased. As for the deviation margin, the deviation margin may be a hysteresis value of at least five percent and is equal to one or more of five percent, ten percent, fifteen percent and twenty percent or higher or any number in-between. Also, the one or more call parameters can include one or more of Internet protocol (IP) addresses, area codes, telephone numbers, and caller identification name (CNAM) data, and the one or more call parameters are included in call messages associated with each of the plurality of calls. When any of those parameters are assigned a weighted value those values are provided in a list which updates depending on the latest value assignments.

Figure 3B:
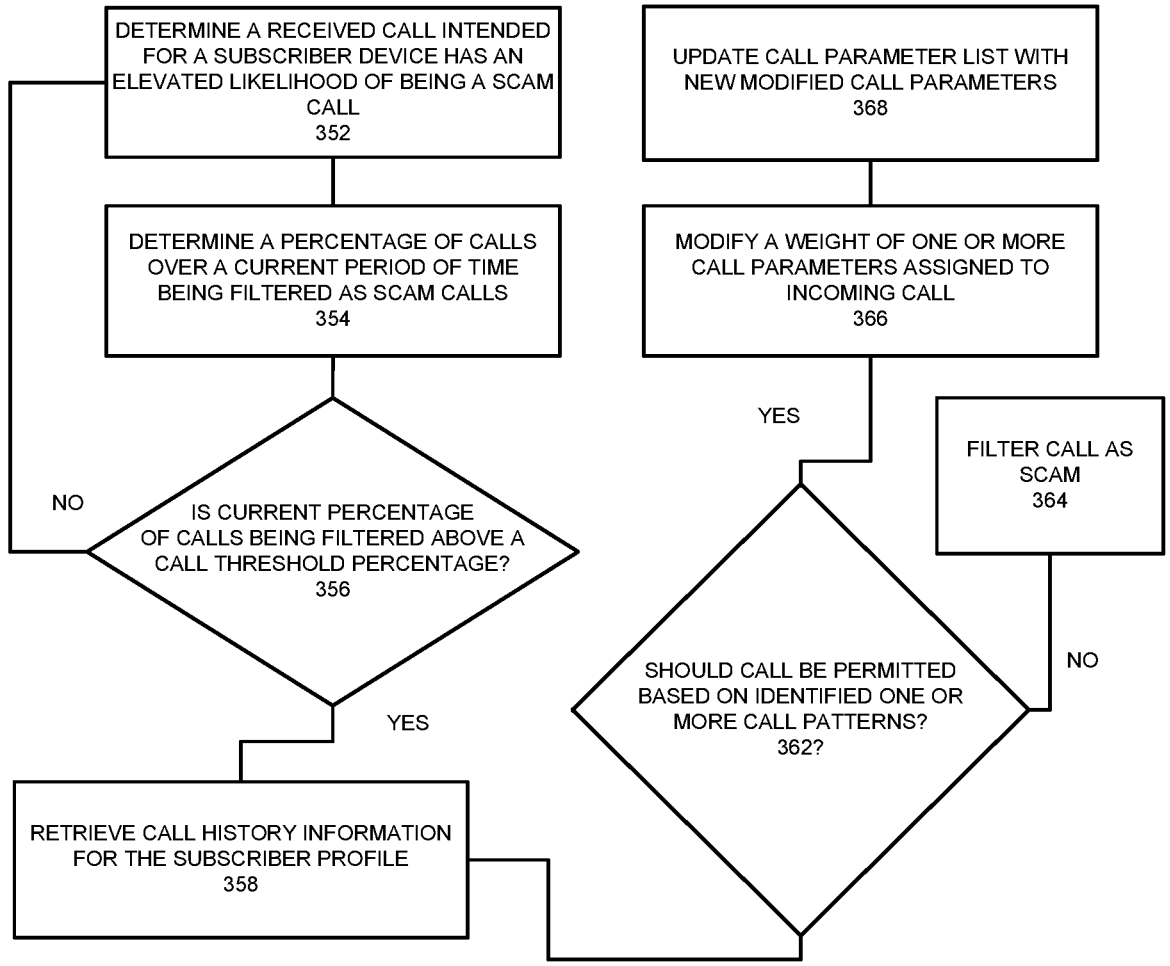
FIG. 3B illustrates a call management procedure for filtering an incoming call based on a particular user profile according to example embodiments.

FIG. 3B illustrates a call management procedure for filtering an incoming call based on a particular user profile according to example embodiments. Referring to FIG. 3B, in this example 350, a same call scam limiting criteria is used as in the other examples, however, for calls on an individual basis, parameter auditing, scoring, etc., may be applied for calls to be labeled as scam or not scam. In this example, however, other exceptions on a per-call basis are applied, such as personal contacts, previous calls, callback history. Also, the current call percentage threshold may be lowered or disregarded in certain circumstances.

In this example procedure, the process 350 provides determining a call received from a calling party and intended for a subscriber device has an elevated likelihood of being a scam call 352, determining a percentage of calls over a current period of time being filtered as scam calls by a carrier server 354, when the percentage of calls being filtered as scam calls during the current period of time is above a call threshold percentage 356, call history information is retrieved associated with a subscriber profile of the subscriber device 358, and one or more call patterns from the call history information of the subscriber profile corresponding to the received call may be identified and used to permit the received call based on the identified one or more call patterns 362. The call patterns may include call history, such as incoming calls from the caller party, outgoing calls to the caller party from the called party, frequency of calls to and from the parties, length of calls to and from the called parties, etc. If no exceptions are identified the call can be filtered out and blocked as scam 364. The weight of the call can be modified 366 once the exception is identified. The exception(s) can be applied as a negative weight (i.e., −2) to offset a call parameter flagged weight. A call parameter list may be updated to include the new call parameters 368 so they can be applied to subsequent incoming calls.

When determining the received call intended for the subscriber device has an elevated likelihood of being a scam call the process may include determining one or more call parameters, from a call message associated with the call, is assigned a weight value that elevates the likelihood of the call being a scam call. The one or more call parameters are not limited to, but can include one or more of: Internet protocol (IP) addresses, telephone area codes, telephone numbers, and caller identification name (CNAM) data. The call patterns associated with the subscriber profile can include one or more of, but are not limited to, a number of times the calling party called the subscriber device, a number of the times the subscriber device called the calling party, a frequency of calls over a period of time that the calling party called the subscriber device or the subscriber device called the calling party, and a length of time of one or more previous call sessions between the calling party and the subscriber device. The process may include modifying a weight value assigned to the one or more call parameters based on the identified one or more call patterns, and storing the modified one or more call parameters in a call parameter list.

The process may also include identifying a call exception from the one or more call patterns, and determining a calling party number associated with the call exception matches a calling party number of the received call. Responsive to determining the calling party number associated with the call exception matches the calling party number of the received call, the process may include forwarding the call to the subscriber device.

Figure 4:
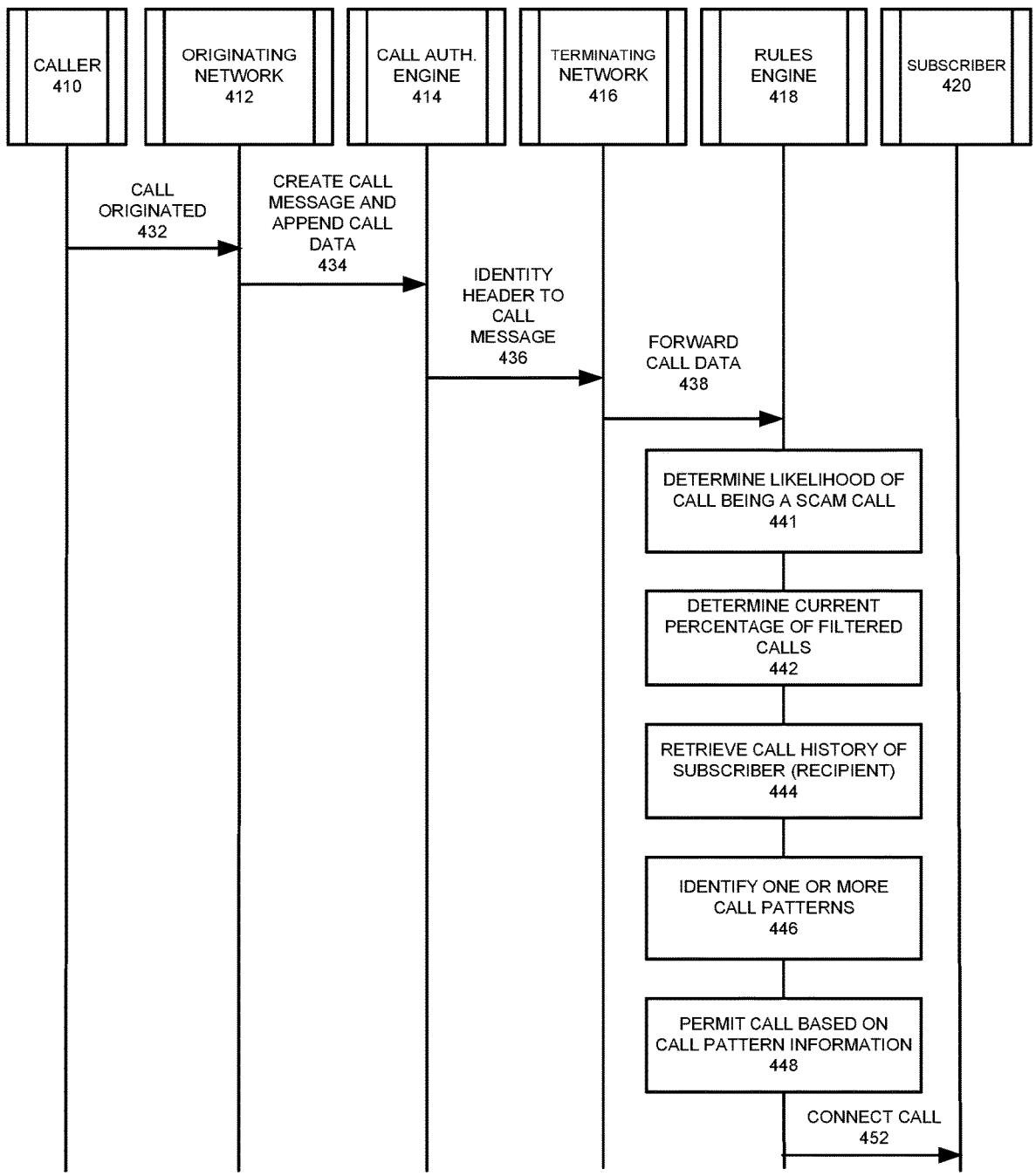
FIG. 4 illustrates a system configuration of a call being received and processed by a call network management configuration according to example embodiments.

FIG. 4 illustrates a system configuration of a call being received and processed by a call network management configuration according to example embodiments. Referring to FIG. 4, the system 400 includes a caller entity 410, such as a calling device on a third party network. The call is originated 432 via the originating network 412 and the call invokes a call message to be created with relevant call message data 434 based on a digital call communication protocol. A call authentication engine 414 may provide a gateway to validate the calling and called parties to identify whether the call is a valid call to valid registered parties. Once the call is received on the receiving end, the terminating network 416 may identify the call header message data 436 to determine which recipient is registered to receive the call. The call data may be forwarded 438 to a rules engine 418 which can then determine a likelihood of the call being a scam 441, determine the current percentage of filtered calls 442, retrieve call history of the subscriber/recipient 444, identify any relevant call patterns 446 from the call history, and permit the call 448 based on the call scoring/pattern information, etc. Then, connect the call 452 to the subscriber 420 assuming the call is not determined to be a scam call.

Figure 5A:
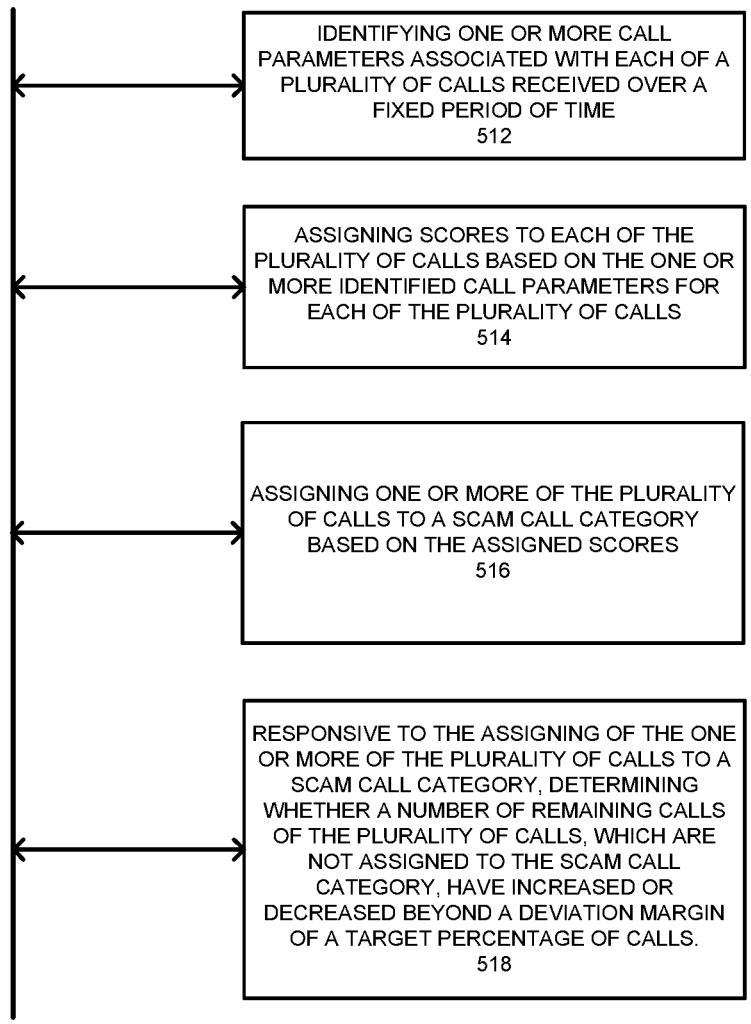
FIG. 5A illustrates a logic flow diagram of call management procedure according to example embodiments.

FIG. 5A illustrates a logic flow diagram of call management procedure according to example embodiments. Referring to FIG. 5A, the process 500 may include identifying one or more call parameters associated with each of a plurality of calls received over a fixed period of time 512, assigning scores to each of the plurality of calls based on the one or more identified call parameters for each of the plurality of calls 514, assigning one or more of the plurality of calls to a scam call category based on the assigned scores 516, responsive to the assigning of the one or more of the plurality of calls to a scam call category, determining whether a number of remaining calls of the plurality of calls, which are not assigned to the scam call category, have increased or decreased beyond a deviation margin of a target percentage of calls 518.

Figure 5B:
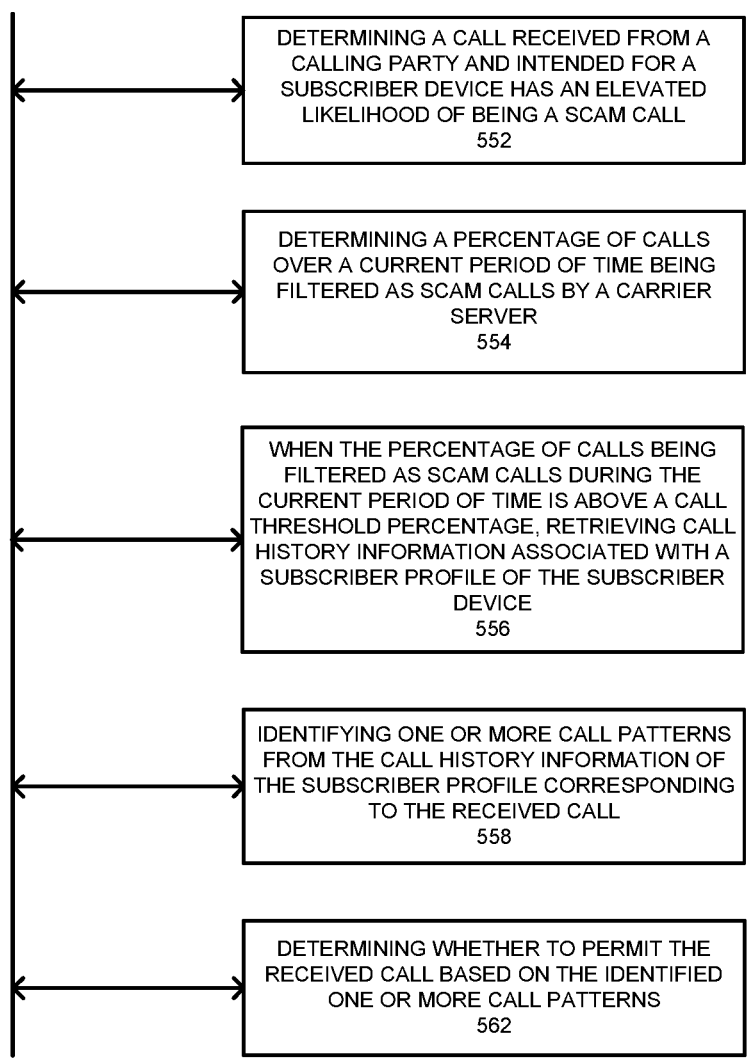
FIG. 5B illustrates a logic flow diagram of a call filtering procedure based on a particular subscriber profile according to example embodiments.

FIG. 5B illustrates a logic flow diagram of a call filtering procedure based on a particular subscriber profile according to example embodiments. Referring to FIG. 5B, the process 550 may include determining a call received from a calling party and intended for a subscriber device has an elevated likelihood of being a scam call 552, determining a percentage of calls over a current period of time being filtered as scam calls by a carrier server 554, when the percentage of calls being filtered as scam calls during the current period of time is above a call threshold percentage, retrieving call history information associated with a subscriber profile of the subscriber device 556, identifying one or more call patterns from the call history information of the subscriber profile corresponding to the received call 558, determining whether to permit the received call based on the identified one or more call patterns 562.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 6:
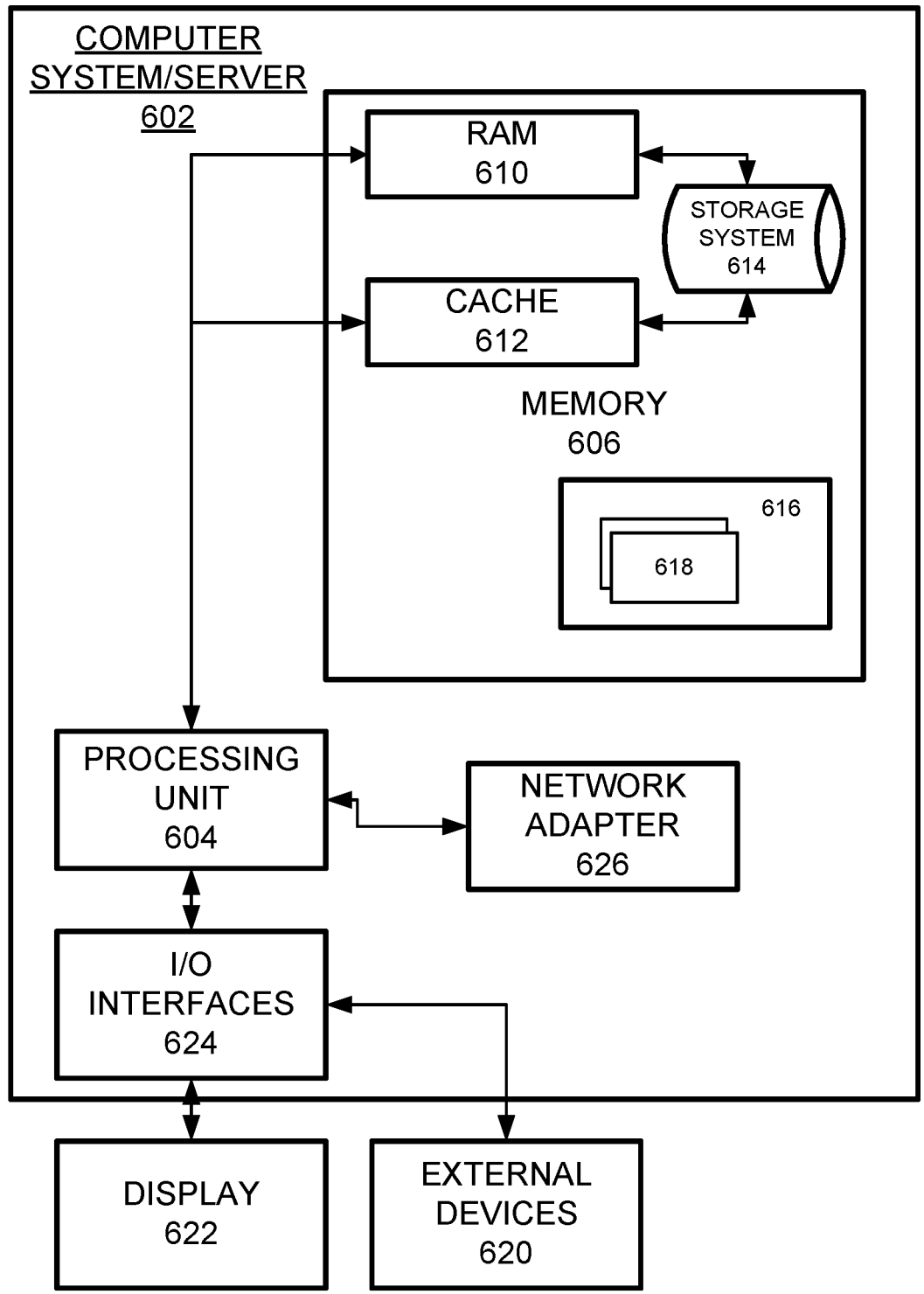
FIG. 6 illustrates an example network entity device configured to store instructions, software, and corresponding hardware for executing the same, according to example embodiments of the present application.

FIG. 6 illustrates an example network entity device configured to store instructions, software, and corresponding hardware for executing the same, according to example embodiments of the present application. FIG. 6 is not intended to suggest any limitation as to the scope of use or functionality of embodiments of the application described herein. Regardless, the computing node 600 is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
identifying one or more call parameters associated with each of a plurality of calls received over a fixed period of time;
assigning scores to each of the plurality of calls based on the one or more identified call parameters for each of the plurality of calls;
assigning one or more of the plurality of calls to a scam call category based on the assigned scores;
responsive to the assigning of the one or more of the plurality of calls to a scam call category, determining whether a number of remaining calls of the plurality of calls, which are not assigned to the scam call category, have increased or decreased beyond a deviation margin of a target percentage of the plurality of calls received over the period of time; and
performing one or more of decreasing or increasing one or more weights assigned to one or more of the call parameters to create one or more modified call parameters depending on whether the number of remaining calls has decreased or increased beyond the deviation margin.

2. The method of claim 1, wherein the assigning scores to each of the plurality of calls based on the one or more identified call parameters for each of the plurality of calls comprises summing weights assigned to each of the one or more identified call parameters for each of the plurality of calls.

3. The method of claim 1, comprising:
when the number of remaining calls has decreased beyond the deviation margin of the target number of calls, decreasing the one or more weights.

4. The method of claim 3, comprising:
identifying the one or more modified call parameters associated with each of a plurality of new calls received over another fixed period of time later than the fixed period of time; and
assigning a score to each of the plurality of new calls based on the decreased one or more assigned weights assigned to the modified call parameters.

5. The method of claim 1, comprising:
when the number of remaining calls has increased beyond the deviation margin of the target number of calls, increasing the one or more weights.

6. The method of claim 1, wherein the deviation margin is at least five percent and is equal to one or more of five percent, ten percent, fifteen percent and twenty percent.

7. The method of claim 1, wherein the one or more call parameters comprise one or more of: Internet protocol (IP) addresses, area codes, telephone numbers, and caller identification name (CNAM) data, and wherein the one or more call parameters are included in call messages associated with each of the plurality of calls.

8. An apparatus comprising:
a processor configured to
identify one or more call parameters associated with each of a plurality of calls received over a fixed period of time,
assign scores to each of the plurality of calls based on the one or more identified call parameters for each of the plurality of calls;
assign one or more of the plurality of calls to a scam call category based on the assigned scores;
responsive to the one or more of the plurality of calls to being assigned a scam call category, determine whether a number of remaining calls of the plurality of calls, which are not assigned to the scam call category, have increased or decreased beyond a deviation margin of a target percentage of the plurality of calls received over the period of time; and
perform one or more of decrease or increase one or more weights assigned to one or more of the call parameters to create one or more modified call parameters depending on whether the number of remaining calls has decreased or increased beyond the deviation margin.

9. The apparatus of claim 8, wherein the assignment of scores to each of the plurality of calls based on the one or more identified call parameters for each of the plurality of calls comprises the processor being configured to sum weights assigned to each of the one or more identified call parameters for each of the plurality of calls.

10. The apparatus of claim 8, wherein the processor is further configured to, when the number of remaining calls has decreased beyond the deviation margin of the target number of calls, decrease the one or more weights.

11. The apparatus of claim 10, wherein the processor is also configured to identify the one or more modified call parameters associated with each of a plurality of new calls received over another fixed period of time later than the fixed period of time, and assigning a score to each of the plurality of new calls based on the decreased one or more assigned weights assigned to the modified call parameters.

12. The apparatus of claim 8, wherein the processor is further configured to, when the number of remaining calls has increased beyond the deviation margin of the target number of calls, increase the one or more weights.

13. The apparatus of claim 8, wherein the deviation margin is at least five percent and is equal to one or more of five percent, ten percent, fifteen percent and twenty percent.

14. The apparatus of claim 8, wherein the one or more call parameters comprise one or more of: Internet protocol (IP) addresses, area codes, telephone numbers, and caller identification name (CNAM) data, and wherein the one or more call parameters are included in call messages associated with each of the plurality of calls.

15. A non-transitory computer readable storage medium configured to store instructions that when executed cause a processor to perform:
identifying one or more call parameters associated with each of a plurality of calls received over a fixed period of time;
assigning scores to each of the plurality of calls based on the one or more identified call parameters for each of the plurality of calls;
assigning one or more of the plurality of calls to a scam call category based on the assigned scores;
responsive to the assigning of the one or more of the plurality of calls to a scam call category, determining whether a number of remaining calls of the plurality of calls, which are not assigned to the scam call category, have increased or decreased beyond a deviation margin of a target percentage of the plurality of calls received over the period of time; and performing one or more of decreasing or increasing one or more weights assigned to one or more of the call parameters to create one or more modified call parameters depending on whether the number of remaining calls has decreased or increased beyond the deviation margin.

16. The non-transitory computer readable storage medium of claim 15, wherein the assigning scores to each of the plurality of calls based on the one or more identified call parameters for each of the plurality of calls comprises summing weights assigned to each of the one or more identified call parameters for each of the plurality of calls.

17. The non-transitory computer readable storage medium of claim 15, wherein the processor is further configured to perform:

when the number of remaining calls has decreased beyond the deviation margin of the target number of calls, decreasing the one or more weights.

18. The non-transitory computer readable storage medium of claim 17, wherein the processor is further configured to perform:

identifying the one or more modified call parameters associated with each of a plurality of new calls received over another fixed period of time later than the fixed period of time; and assigning a score to each of the plurality of new calls based on the decreased one or more assigned weights assigned to the modified call parameters.

19. The non-transitory computer readable storage medium of claim 15, wherein the processor is further configured to perform:

when the number of remaining calls has increased beyond the deviation margin of the target number of calls, increasing the one or more weights.

20. The non-transitory computer readable storage medium of claim 15, wherein the deviation margin is at least five percent and is equal to one or more of five percent, ten percent, fifteen percent and twenty percent.

\* \* \* \* \*